United States Patent
Ahn et al.

(10) Patent No.: US 9,501,216 B2
(45) Date of Patent: Nov. 22, 2016

(54) METHOD AND SYSTEM FOR DISPLAYING A LIST OF ITEMS IN A SIDE VIEW FORM AND AS A SINGLE THREE-DIMENSIONAL OBJECT IN A TOP VIEW FORM IN A MOBILE DEVICE

(75) Inventors: Yu Mi Ahn, Seoul (KR); Young Sun Shin, Seongnam-si (KR); Myoung Hwan Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 13/008,350

(22) Filed: Jan. 18, 2011

(65) Prior Publication Data
US 2011/0197164 A1    Aug. 11, 2011

(30) Foreign Application Priority Data

Feb. 11, 2010 (KR) .......................... 10-2010-0012930

(51) Int. Cl.
*G06F 3/00* (2006.01)
*G06F 3/0488* (2013.01)
*G06F 3/01* (2006.01)

(52) U.S. Cl.
CPC ... *G06F 3/0488* (2013.01); *G06F 2203/04802* (2013.01)

(58) Field of Classification Search
USPC ....... 715/835, 810, 823, 818, 825, 830, 719, 715/730; 345/173, 156, 473, 634, 672, 649
See application file for complete search history.

(56) References Cited

U.S. PATENT DOCUMENTS

| 6,097,393 | A   * | 8/2000  | Prouty et al. .................. 345/419 |
| 6,252,602 | B1 * | 6/2001  | Matsuda et al. ............... 345/589 |
| 6,466,237 | B1 * | 10/2002 | Miyao et al. .................. 715/838 |
| 6,577,330 | B1 * | 6/2003  | Tsuda et al. ................... 715/782 |
| 7,013,435 | B2 * | 3/2006  | Gallo et al. .................... 715/850 |
| 7,383,503 | B2 * | 6/2008  | Banks ............................ 715/273 |
| 7,487,467 | B1 * | 2/2009  | Kawahara ........... G06F 3/04817 715/762 |
| 7,503,014 | B2 * | 3/2009  | Tojo et al. ..................... 715/810 |
| 7,685,530 | B2 * | 3/2010  | Sherrard et al. ............... 715/764 |
| 7,921,376 | B2 * | 4/2011  | Robertson et al. ........... 715/782 |
| 7,921,379 | B1 * | 4/2011  | Ko .................... G06F 17/30873 715/733 |
| 8,041,155 | B2 * | 10/2011 | Mihara et al. ................ 382/305 |
| 8,615,720 | B2 * | 12/2013 | Bradea .......................... 715/835 |

(Continued)

FOREIGN PATENT DOCUMENTS

CN          1959634 A     5/2007
EP          0 435 601 A2  7/1991

(Continued)

*Primary Examiner* — Toan Vu
(74) *Attorney, Agent, or Firm* — Jefferson IP Law, LLP

(57) ABSTRACT

A method and system for displaying a screen in a mobile device are provided. The method includes displaying a list of items where the items are arranged in a three-dimensional form, viewed from a side, receiving a command for altering the display form of the list of items, and altering and displaying the image of the list of items, viewed from the side, into an image of the list of items viewed from above. The method and system allow a user to easily and rapidly search for a corresponding item on a screen of a mobile device.

17 Claims, 10 Drawing Sheets

(56) References Cited

U.S. PATENT DOCUMENTS

| | | | |
|---|---|---|---|
| 8,627,206 B2* | 1/2014 | Ogikubo | G06F 3/0483 345/184 |
| 8,713,011 B2* | 4/2014 | Asai et al. | 707/736 |
| 8,745,535 B2* | 6/2014 | Chaudhri et al. | 715/850 |
| 8,812,990 B2* | 8/2014 | Reponen et al. | 715/848 |
| 8,826,160 B2* | 9/2014 | Sherrard et al. | 715/764 |
| 8,970,669 B2* | 3/2015 | Klappert | H04N 13/007 348/43 |
| 9,009,622 B2* | 4/2015 | Roberts | G06F 3/0482 715/802 |
| 9,035,877 B2* | 5/2015 | Algreatly | G06F 3/04815 345/157 |
| 2002/0163546 A1* | 11/2002 | Gallo | 345/848 |
| 2004/0100479 A1* | 5/2004 | Nakano | G06F 1/1626 715/700 |
| 2005/0034084 A1* | 2/2005 | Ohtsuki et al. | 715/864 |
| 2005/0091596 A1* | 4/2005 | Anthony et al. | 715/712 |
| 2005/0154607 A1* | 7/2005 | Terzidis | G06Q 99/00 715/853 |
| 2005/0160377 A1* | 7/2005 | Sciammarella et al. | G06F 3/0481 715/838 |
| 2005/0210410 A1* | 9/2005 | Ohwa et al. | 715/821 |
| 2006/0031776 A1* | 2/2006 | Glein et al. | 715/779 |
| 2006/0069997 A1* | 3/2006 | Hsieh et al. | 715/713 |
| 2006/0107229 A1* | 5/2006 | Matthews et al. | 715/782 |
| 2006/0156228 A1* | 7/2006 | Gallo et al. | 715/523 |
| 2006/0274060 A1* | 12/2006 | Ni et al. | 345/419 |
| 2007/0120846 A1 | 5/2007 | Ok et al. | |
| 2007/0136681 A1* | 6/2007 | Miller | 715/782 |
| 2007/0152981 A1* | 7/2007 | Im et al. | 345/173 |
| 2007/0164989 A1* | 7/2007 | Rochford et al. | 345/156 |
| 2007/0192727 A1* | 8/2007 | Finley et al. | 715/781 |
| 2007/0226652 A1* | 9/2007 | Kikuchi et al. | 715/836 |
| 2008/0059896 A1* | 3/2008 | Anderson et al. | 715/764 |
| 2008/0134086 A1* | 6/2008 | Liao et al. | 715/810 |
| 2008/0159708 A1* | 7/2008 | Kazama et al. | 386/69 |
| 2008/0266289 A1* | 10/2008 | Park | 345/419 |
| 2008/0307320 A1* | 12/2008 | Payne | G06F 3/0481 715/751 |
| 2009/0002335 A1* | 1/2009 | Chaudhri | 345/173 |
| 2009/0007018 A1* | 1/2009 | Ikeda et al. | 715/838 |
| 2009/0019401 A1 | 1/2009 | Park et al. | |
| 2009/0064009 A1* | 3/2009 | Krantz et al. | 715/764 |
| 2009/0080698 A1* | 3/2009 | Mihara et al. | 382/103 |
| 2009/0083670 A1* | 3/2009 | Roos | 715/850 |
| 2009/0150775 A1* | 6/2009 | Miyazaki et al. | 715/702 |
| 2009/0231356 A1* | 9/2009 | Barnes | G06F 3/0482 345/594 |
| 2009/0241061 A1* | 9/2009 | Asai et al. | 715/808 |
| 2009/0307623 A1* | 12/2009 | Agarawala et al. | 715/765 |
| 2009/0313584 A1* | 12/2009 | Kerr | G06F 3/012 715/849 |
| 2010/0013757 A1* | 1/2010 | Ogikubo | 345/156 |
| 2010/0023858 A1* | 1/2010 | Ryu et al. | 715/702 |
| 2010/0058213 A1* | 3/2010 | Higuchi et al. | 715/766 |
| 2010/0064259 A1* | 3/2010 | Alexanderovitc | G06F 1/1626 715/852 |
| 2010/0070911 A1* | 3/2010 | Huang | G06Q 10/107 715/782 |
| 2010/0083165 A1* | 4/2010 | Andrews | G06F 1/1626 715/784 |
| 2010/0125816 A1* | 5/2010 | Bezos | 715/863 |
| 2010/0175026 A1* | 7/2010 | Bortner et al. | 715/818 |
| 2010/0220978 A1* | 9/2010 | Ogikubo | G06F 3/04815 715/716 |
| 2010/0306703 A1* | 12/2010 | Bourganel et al. | 715/823 |
| 2010/0333025 A1* | 12/2010 | Roberts | G06F 3/0482 715/823 |
| 2010/0333030 A1* | 12/2010 | Johns | G06F 3/04815 715/834 |
| 2011/0061021 A1* | 3/2011 | Kang et al. | 715/800 |
| 2011/0283236 A1* | 11/2011 | Beaumier et al. | 715/835 |
| 2013/0111394 A1* | 5/2013 | Reed | G06F 3/0481 715/781 |
| 2013/0205243 A1* | 8/2013 | Rivera et al. | 715/776 |
| 2014/0059430 A1* | 2/2014 | White | G06F 17/30017 715/716 |
| 2014/0245156 A1* | 8/2014 | Roos | 715/728 |
| 2014/0337324 A1* | 11/2014 | Chao et al. | 707/722 |

FOREIGN PATENT DOCUMENTS

| | | |
|---|---|---|
| EP | 1 341 072 A1 | 9/2003 |
| EP | 1 780 633 A2 | 5/2007 |
| JP | 2008-084249 A | 4/2008 |
| KR | 10-0703813 B1 | 4/2007 |
| KR | 10-2007-0046448 A | 5/2007 |
| KR | 10-2008-0094333 A | 10/2008 |
| KR | 10-2009-0005680 A | 1/2009 |

* cited by examiner

FIG. 7
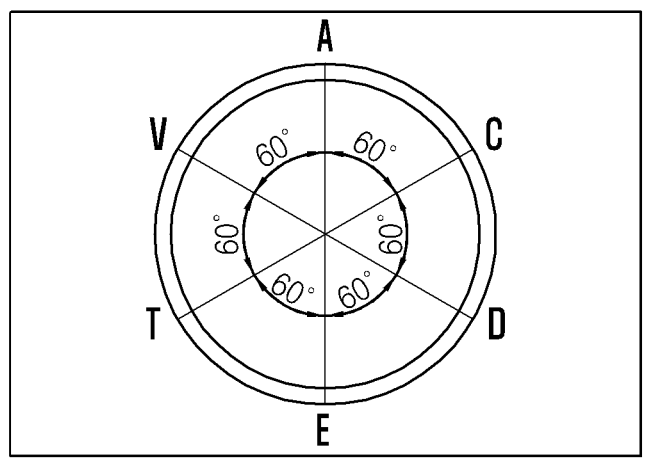
[A]
N : 6
M : 8
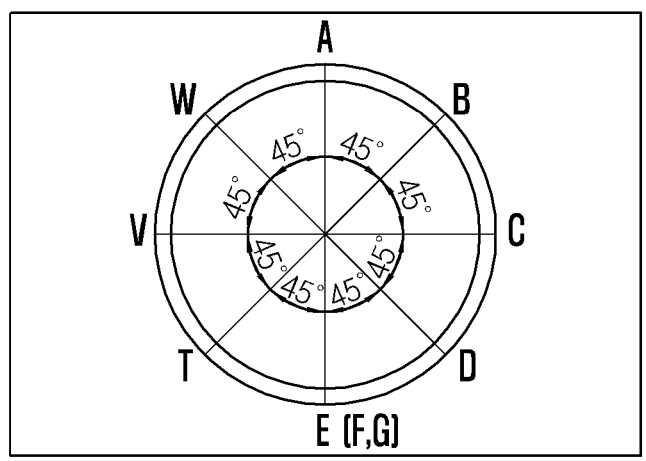
[B]
N : 10
M : 8

FIG. 9
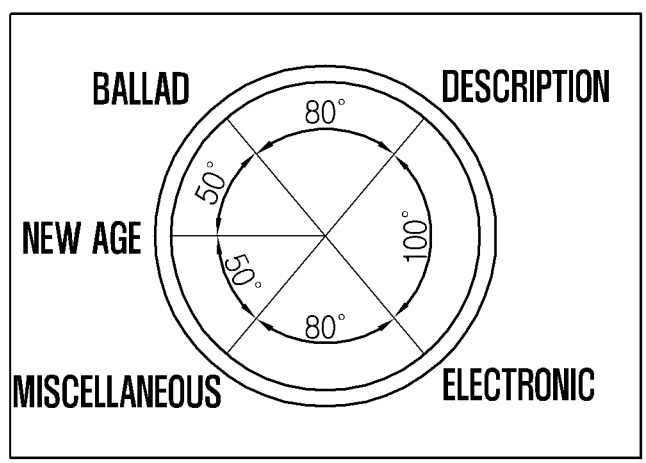
[ A ]
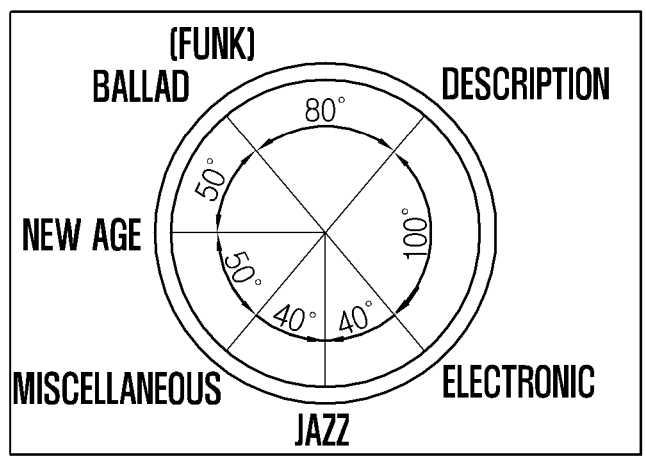
[ B ]

FIG. 10
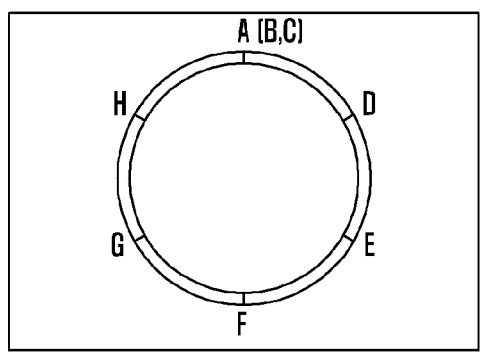
[A]
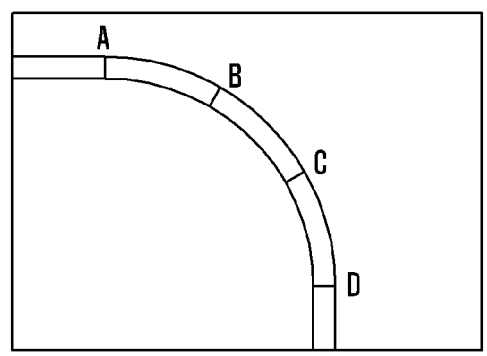
[B]
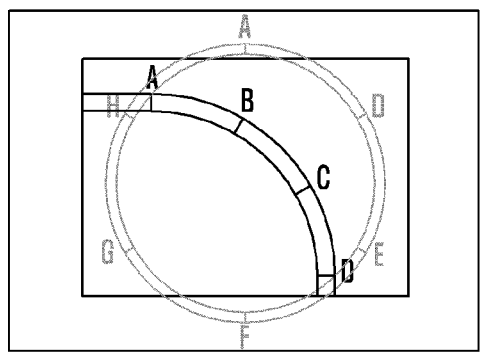
[C]
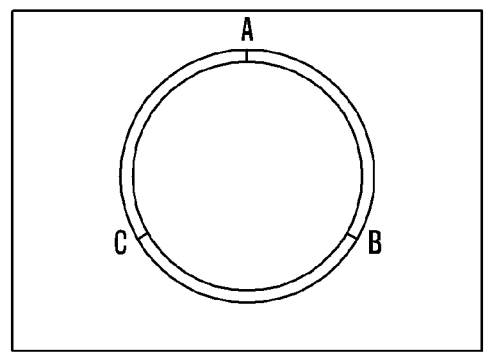
[D]

METHOD AND SYSTEM FOR DISPLAYING A LIST OF ITEMS IN A SIDE VIEW FORM AND AS A SINGLE THREE-DIMENSIONAL OBJECT IN A TOP VIEW FORM IN A MOBILE DEVICE

PRIORITY

This application claims the benefit under 35 U.S.C. §119 (a) of a Korean patent application filed on Feb. 11, 2010 in the Korean Intellectual Property Office and assigned Serial No. 10-2010-0012930, the entire disclosure of which is hereby incorporated by reference.

BACKGROUND OF THE INVENTION

1. Field of the Invention

This invention relates to mobile devices, and more particularly, to a method and system for displaying a screen containing at least one item on a touch screen-based mobile device.

2. Description of the Related Art

In recent years, mobile devices have been widely used because they can be easily carried and provide a variety of functions in addition to as a voice call function. Mobile devices are now serving as multimedia communication systems since they can provide a data transmission service and various additional services. Most of the recently released mobile devices have been equipped with a touch screen. This provides convenient use to users.

Mobile devices display a screen containing at least one item on their touch screens, so that the users can search for a corresponding item by performing a scrolling operation and touch the searched item to execute a corresponding function. This display system allows the users to easily search for items when the number of items to be displayed on one screen is relatively small.

However, while the number of items to be displayed on one screen is increasing, users require additional time to search for a corresponding item by performing a number of scrolling operations. This makes users feel inconvenienced.

SUMMARY OF THE INVENTION

An aspect of the present invention is to address at least the above-mentioned problems and/or disadvantages and to provide at least the advantages described below. Accordingly, an aspect of the present invention is to provide a method and system that allows a user to easily and rapidly search for a corresponding item on a screen of a mobile device.

In accordance with an exemplary embodiment of the invention, a method for displaying a screen is provided. The method includes displaying a list of items where the items are arranged in a three-dimensional form, viewed from the side, receiving a command for altering the display form of the list of items, and altering and displaying the image of the list of items, viewed from the side, into an image of the list of items viewed from above.

In accordance with another exemplary embodiment of the invention, a system for displaying a screen is provided. The system includes a display unit, an input unit for receiving a user's commands, and a controller for controlling the display unit to display a list of items, configured in a three-dimensional form, viewed from the side. The controller controls the input unit to receive a command for altering the display form of the list of items. The controller also controls the display unit to alter and display the display form of the list of items, viewed from the side, into the display form of the list of items viewed from above.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which:

FIGS. 7A and 7B are an arrangement of an index according to the method of FIG. 6;

FIGS. 9A and 9B are an arrangement of an index according to the method of FIG. 8; and FIGS. 10A to 10D are various shapes of grouped index areas according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, although exemplary embodiments of the present invention are explained based on a mobile device equipped with a touch screen, it should be understood that the present invention is not limited thereto. It will be appreciated that the present invention can be applied to all information communication devices, multimedia devices, and their applications, when they are equipped with a touch screen, for example, a mobile communication terminal, a Portable Multimedia Player (PMP), a Personal Digital Assistant (PDA), a smart phone, a Motion Picture Experts Group Audio Layer 3 (MP3) player, etc.

In addition, although the present invention is described based a mobile device with a touch screen, it can also be applied to other mobile devices that are not equipped with touch screens but switch their display screens via other input mechanisms.

Figure 1:
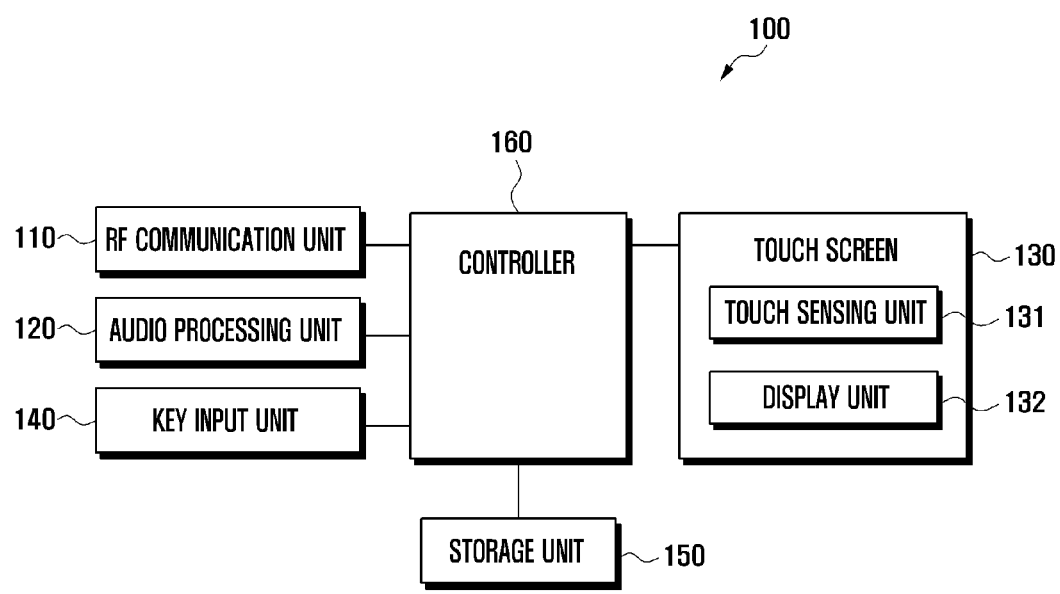
FIG. 1 is a schematic block diagram of a mobile device according to an exemplary embodiment of the present invention.

FIG. 1 is a schematic block diagram of a mobile device according to an exemplary embodiment of the present invention.

Referring to FIG. 1, the mobile device 100 includes a Radio Frequency (RF) communication unit 110, an audio processing unit 120, a touch screen 130, a key input unit 140, a storage unit 150, and a controller 160.

The RF communication unit 110 transmits and receives data to and from other mobile devices via wireless communication. The RF communication unit 110 includes an RF transmitter for up-converting the frequency of signals to be transmitted and amplifying the signals and an RF receiver for low-noise amplifying received RF signals and down-converting the frequency of the received RF signals. The RF communication unit 110 receives data via a wireless channel and transfers it to the controller 160. The RF communication unit 110 also transmits data output from the controller 160 via a wireless channel.

The audio processing unit 120 includes COders and DECoders (CODECs). The CODECs are comprised of a data CODEC for processing packet data, etc., and an audio CODEC for processing audio signals, such as voice signals, etc. The audio CODEC converts digital audio signals into analog audio signals and outputs them via a speaker SPK. The audio CODEC also converts analog audio signals received by a microphone MIC into digital audio signals.

The touch screen 130 includes a touch sensing unit 131 and a display unit 132. The touch sensing unit 131 detects a user's input touches. The touch sensing unit 131 may be implemented with various types of touch sensors, for example, a capacitive overlay type sensor, a resistive overlay type sensor, an infrared beam type sensor, a pressure sensor, etc. It should be understood that the present invention is not limited to the sensors listed above. The touch sensing unit 131 can be implemented with any type of sensor that can detect touch or contact. The touch sensing unit 131 detects a user's touch that is input to the touch screen 130, creates a touch signal, and outputs the touch signal to the controller 160. The touch signal contains coordinate data of a user's input touch. When a user gestures to move his/her touch location, the touch sensing unit 131 creates a detected signal containing coordinate data for the touch location movement path and outputs it to the controller 160. The touch location movement gesture includes a flick and a drag. A flick refers to a gesture where the speed of moving a touch location exceeds a preset value. A drag refers to a gesture where the speed of moving a touch location is less than the preset value.

The display unit 132 may be implemented with a Liquid Crystal Display (LCD), an Organic Light Emitting Diode (OLED), an Active Matrix Organic Light Emitting Diodes (AMOLED), or the like. The display unit 132 displays menus, input data, function-setting information, and addition information for the mobile device 100. For example, the display unit 132 displays a booting screen, an idle screen, a menu screen, a call screen, and application executing screens of the mobile device 100.

The key input unit 140 allows a user to operate keys to control the mobile device 100, creates input signals, and outputs them to the controller 160. The key input unit 140 may be implemented with a keypad containing alphanumeric keys and direction keys. The key input unit 140 may also be implemented with function keys installed to the mobile device 100. When the mobile device 100 is configured in such a way that the touch screen 130 can also serve as an input mechanism, the key input unit 140 may be omitted in the mobile device 100.

The storage unit 150 serves to store data and programs required to operate the mobile device 100. In an exemplary embodiment of the present invention, the storage unit 150 stores item images, item list images, property information about the items, etc. The storage unit 150 also stores patterns of touches input to the touch screen 130 and information about screen alteration according to the touch patterns.

The controller 160 stores the entire operation of the mobile device 100. The controller 160 controls the display unit 132 to display a list of items arranged in a three-dimensional format and viewed from the side. When the controller 160 receives a command for altering the display form of the item list, via the touch sensing unit 131 or the key input unit 140, it controls the display unit 132 to alter the current image into an image of the list of items as they are arranged in the three-dimensional format and viewed from above. When the controller 160 determines that the user inputs a signal to select a certain area in an image displaying the list of items as viewed from above, via the touch sensing unit 131 or the key input unit 140, the controller determines an item corresponding to the selected area. In addition, when the controller 160 then receives a command for altering the display form of the item list via the touch sensing unit 131 or the key input unit 140, it controls the display unit 132 to re-arrange the form back into an image of the display form of the item list as viewed from the side.

In an exemplary embodiment of the present invention, the controller 160 controls the display unit 132 to display a category icon. When the controller 160 receives a signal to select a category icon via the touch sensing unit 131 or the key input unit 140, it controls the display unit 132 to display a category list containing at least one category. When the controller 160 receives a signal to select one from among the categories in the list, via the touch sensing unit 131 or the key input unit 140, it re-classifies items in the selected category by indexes. When the controller 160 receives a command to alter the display form of the item list, via the touch sensing unit 131 or the key input unit 140, it controls the display unit 132 to alter and display the list of re-classified items into an image of the display form as they are viewed from the side.

In an exemplary embodiment of the present invention, when the controller 160 displays an index on a view image at the top of the item list, it detects the number of indexes, N, contained in the item list, and compares N with the maximum number of indexes, M, that can be displayed on one screen. When the controller 160 determines that N is equal to or less than M, it controls the display unit 132 to display the N indexes in preset order. On the other hand, when the controller 160 determines that N is greater than M, it detects the number of items classified by respective indexes, and determines the order of indexes according to the highest number of items. After that, the controller 160 controls the display unit 132 to display the first to $M^{th}$ indexes in preset order. In addition, the controller 160 can group at least one from the $(M+1)^{th}$ to $N^e$ indexes into one from the first to $M^{th}$ indexes.

In another exemplary embodiment of the present invention, when the controller 160 displays an index on a view image at the top of the item list, it compares the number of indexes, N, contained in the item list, with the maximum number of indexes, M, that can be displayed on one screen. When the controller 160 determines that N is equal to or less than M, it detects the number of items classified by respective indexes, and identifies the sizes of the areas corresponding to the respective indexes according to the number of detected items. After that, the controller 160 controls the display unit 132 to allocate and display the N indexes to the identified sizes of areas, in preset order. On the other hand, when the controller 160 determines that N is greater than M, it detects the sizes of areas corresponding to the first to $M^{th}$ indexes, according to the number of detected items. After that, the controller 160 controls the display unit 132 to allocate and display the first to Mth indexes to the detected sizes of areas in preset order. In addition, the controller 160 can group at least one from the $(M+1)^{th}$ to $N^{th}$ indexes into one from the first to $M^{th}$ indexes.

In an exemplary embodiment of the present invention, the mobile device 100 may further include a motion sensing unit (not shown). Examples of the motion sensing unit are an acceleration sensor, a gyro sensor, a terrestrial magnetic sensor, etc. When a motion sensing unit is installed to the mobile device 100, it can detect a user's input motion, create a detected signal and transfer it to the controller 160. When the motion sensing unit is implemented with an acceleration sensor, the detected signal contains acceleration data. The controller 160 detects a user's input motion via the detected signal and performs a corresponding function.

Figure 2:
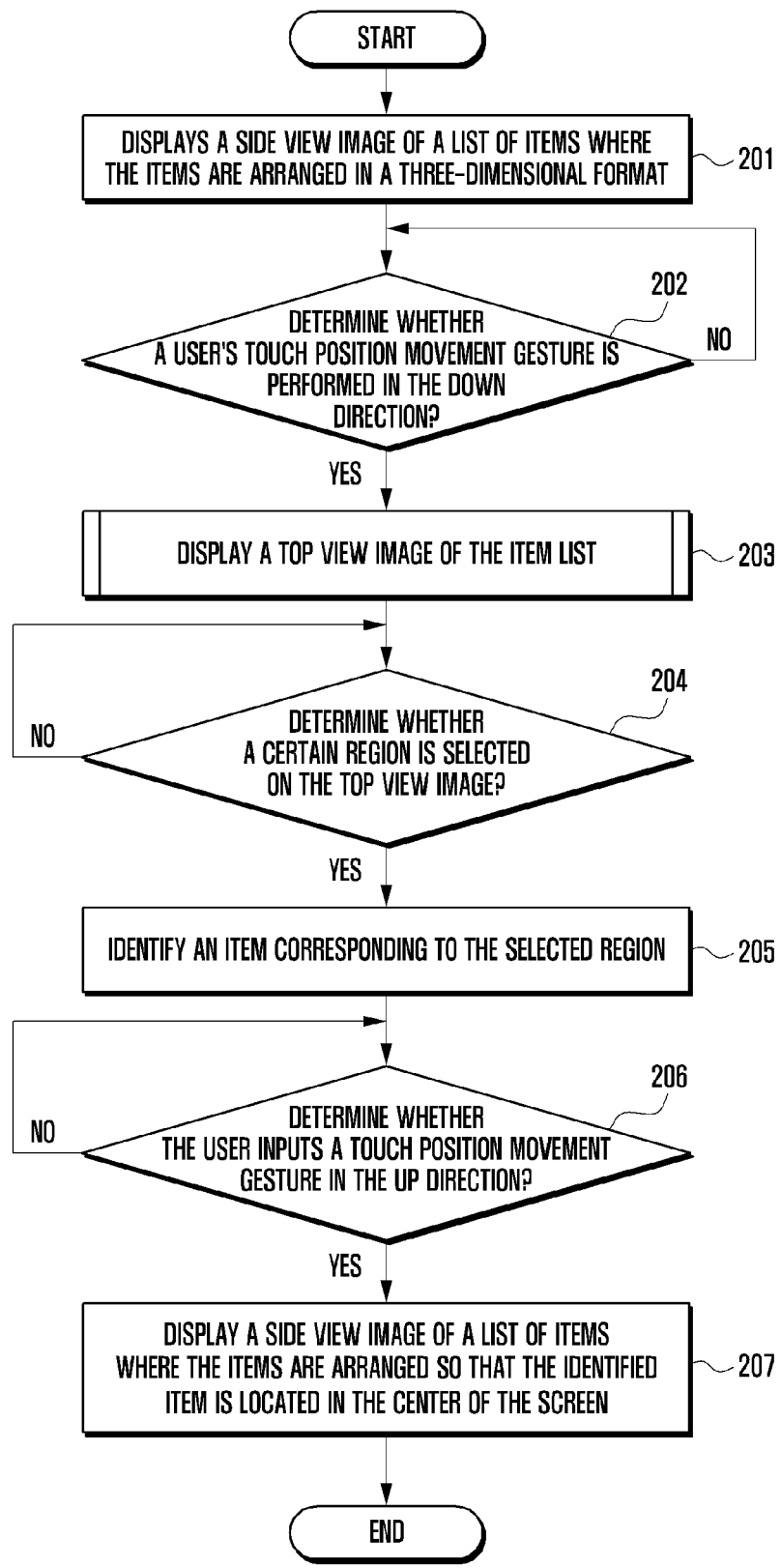
FIG. 2 is a flowchart describing an exemplary embodiment of a method for displaying a screen of a mobile device according to the present invention.

FIG. 2 is a flowchart describing an exemplary embodiment of a method for displaying a screen of a mobile device according to the present invention.

FIGS. 3A to 3E are screens that a mobile device displays on a display unit according to the method of FIG. 2.

Referring to FIG. 2, the controller 160 controls the display unit 132 to displays a list of items that are arranged in a three-dimensional format and viewed from the side, i.e., a side view image, at step 201. In an exemplary embodiment of the present invention, the items can be configured in a plane shape (e.g., a disc, a circular plane, a rectangular plane, etc.). The items with a plane shape may configure an item list as they are arranged in a diagram, such as a circle, a rectangle, a semicircle, etc. In that case, the items form a list of items in a three-dimensional form. The side view image of the item list refers to an image when a user views the side of the list of items arranged in a three-dimensional format, or an image when a user views the list of items from the side with an inclined angle. When a user views the item list arranged in a three-dimensional format from the side, he/she can view only the side of the item list. In that case, the side view image is a two-dimensional image. On the other hand, when the user sees the item list from a side with an inclined angle, he/she can view multiple sides of the item list. In that case, the side view image is a three-dimensional image. The side view image can be configured with all or part of the items contained in the item list. In an exemplary embodiment of the present invention, the side view image is configured with part of the items in the item list.

The controller 160 controls the display unit 132 to display item-related information, currently focused, together with a side view image. The term 'focused item' refers to an item that is in a standby state waiting for the function execution. When the display unit 132 displays the side view image, the focused item can be displayed on the center portion of the display unit 132 or displayed in such a way that it is distinguished from other items in terms of, for example, size, color, or brightness. In an exemplary embodiment of the present invention, the item-related information may be item name information that an item corresponds to and property information about other items. For example, when an item corresponds to music content, the item-related information may correspond to playlist (music title), artist, album, genre, production date (year), etc. In an exemplary embodiment of the present invention, the item-related information may contain index information corresponding to a group name for classifying items.

Figure 3:
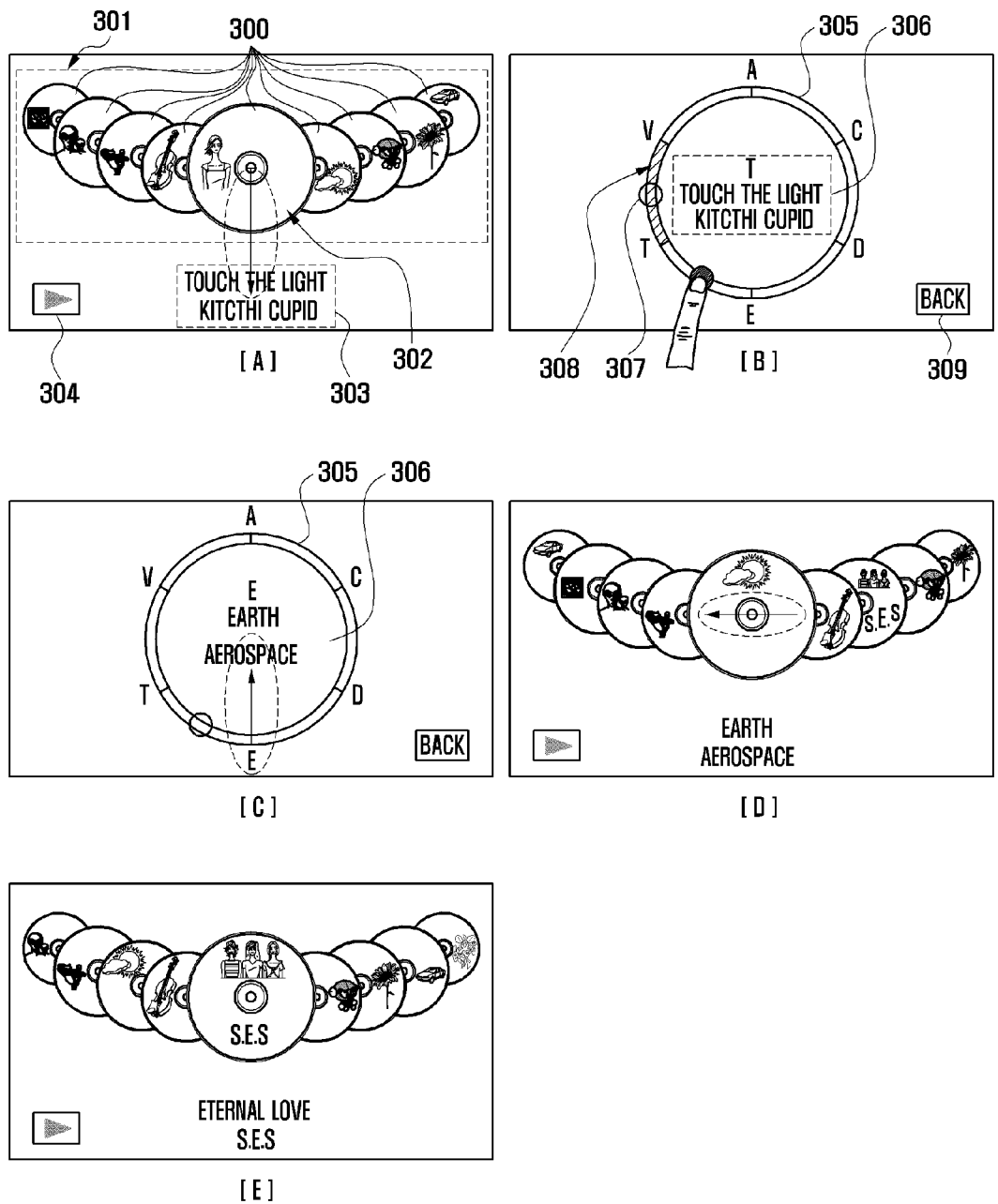
FIGS. 3A to 3E are screens that a mobile device displays on a display unit according to the method of FIG. 2.

Referring to FIG. 3A, the display unit 132 displays a side view image 301 of a list of items where the items are music contents. The respective items are each formed to display as a disc. The items are arranged in a circle, configuring a list. The side view image 301 refers to an image when the user views the list of items from the side with an inclined angle. The side view image 301 is configured with part of the items 300 from among all items in the list and does not display the rest of the items. The part of items 300 in the side view image 301 displays album images respectively. The item-related information 303 (e.g., TOUCH THE LIGHT) and the artist (KITCTHI CUPID) are displayed below the focused item 302.

In an exemplary embodiment of the present invention, the side view image 301 is displayed on the display unit 132 when the mobile device 100 is held in a horizontal orientation. To this end, the mobile device 100 must include a motion sensing unit (not shown). When the mobile device 100 is held in a vertical orientation, i.e., the length of the display unit 132 is vertically postured, the controller 160 controls the display unit 132 to arrange items in the vertical direction. After that, when the user tilts the mobile device 100 so that the length of the display unit 132 is positioned horizontally, the motion sensing unit detects the motion of the mobile device 100, creates a detected signal and transfers it to the controller 160. The controller 160 determines that the mobile device 100 is positioned in the horizontal orientation via the detected signal from the motion sensing unit, and controls the display unit 132 to alter and display the display form of the item list. In that case, the controller 160 controls the display unit 132 to display the side view image 301.

After displaying the side view image 301 at step 201, the controller 160 controls the touch sensing unit 131 to determine whether a user's touch gesture is performed in the down direction at step 202. When the user inputs a touch onto the touch screen 130 and then moves the touch position in the down direction, the touch sensing unit 131 creates a detected signal containing coordinate data corresponding to the touch movement path and then transfers it to the controller 160. The controller 160 determines that the user moved the touch position in the down direction via the detected signal from the touch sensing unit 131. At step 202, the 'touch position movement gesture in the down direction' corresponds to a command to alter the form of the item list. Although the exemplary embodiment shown in FIG. 2 is described in such as way that the command to alter the form of the item list employs the 'touch position movement gesture in the down direction,' it should be understood that the present invention is not limited to the exemplary embodiment. That is, the command to alter the form of the item list can also be implemented with all types of touch gestures applied to the touch screen. For example, step 202 can be modified in such a way that the controller 160 controls the touch sensing unit 131 to determine whether a touch position movement gesture is input in the up direction or in the right or left side direction. While applying the touch position movement gesture to step 202, it is preferable that the direction of the touch position movement gesture does not match the arrangement direction of icons in an icon list. As shown in the example of FIG. 3A, since the items are arranged at both sides in the side view image 301, it is preferable that the direction of the touch position movement gesture, applied at step 202, does not match the right and left direction.

In an exemplary embodiment of the present invention, the controller 160 controls the display unit 132 to display an icon to alter the form of the item list. The controller 160 also controls the touch sensing unit 131 to determine whether a touch is made on the icon displayed on the display unit 132. When the key input unit 140 includes a key to alter the form of the item list, the controller 160 controls the key input unit 140 to determine whether the key is operated.

Referring to FIG. 3A, it is shown that a user inputs a touch position movement gesture in the down direction. It is also shown that a 'Play' icon 304 for altering the form of the item list is displayed on the display unit. The user can touch the 'Play' icon 304 to input a command to alter the form of the item list to the mobile device 100, instead of inputting a touch position movement gesture in the down direction.

When the touch position movement gesture is performed in the down direction at step 202, the controller 160 controls the display unit 132 to display a top view image of the item list at step 203. In an exemplary embodiment of the present invention, the 'top view image' of the item list refers to an image when a user sees a list of items, configured in a three-dimensional form, from above. When a user sees the item list arranged in a three-dimensional format from above, he/she can only view the side of the item list. In that case, the top view image is a two-dimensional image. When the item list is configured in a circle, the top view image of the item list is a two-dimensional circle image. When the item list is formed in a rectangle, the top view image of the item list is a two-dimensional rectangular image. In an exemplary embodiment of the present invention, the top view image of the item list may be an image of when the user views a three-dimensional item list, or an image as the form of the item list is simplified. For example, when the item list is configured as disc formed items arranged in a circle, the top view image may be an image as they are arranged, or a ring image as they are simplified. In an exemplary embodiment of the present invention, it is preferable that the top view image is formed with the entire item contained in the item list.

In an exemplary embodiment of the present invention, the controller 160 controls the display unit 132 to display at least one index. The index refers to a group name that classifies items. The controller 160 controls the display unit 132 to display a top view image and also an index on or adjacent to the top view image. The controller 160 can control the display unit 132 to separate and display the indexes from each other with the same interval. In addition, the controller 160 can also control the display unit 132 to separate and display the indexes from each other with different intervals according to the index properties. The description related to displaying the indexes will be provided in detail, later, referring to FIGS. 6 to 9.

In an exemplary embodiment of the present invention, the controller 160 can allocate areas to the indexes, respectively, on the top view image. The controller 160 controls the display unit 132 to distinguish and display the areas allocated to the respective indexes. The controller 160 controls the display unit 132 to display information about the allocated areas, for example, the allocated ratio with respect to the entire area, etc. The controller 160 controls the display unit 132 to an icon for returning back to the side view image 301 of the item list. In an exemplary embodiment of the present invention, the controller 160 can control the display unit 132 to display a focus effect of an area where a currently focused item is located. The focus effect can be achieved in such a way that the display unit 132 displays a cursor in a certain region on the top view image and alters the color of the index area containing the currently focused item to another color so that it can be distinguished from the color of the other index areas. The controller 160 can also control the display unit 132 to display information related to a currently focused item. The item-related information may contain item names, item property information and index information.

Referring to FIG. 3B, the display unit 132 displays a top view image 305 of the item list. Exemplary indexes, 'A,' 'C,' 'D,' 'E,' 'T,' and 'V,' are displayed adjacent to the top view image 305, and spaced apart from each other with the same interval. A currently focused item is the music content where the playlist is 'TOUCH THE LIGHT,' and the musician is 'KITCTHI CUPID.' As shown in FIG. 3B, the item-related information 306 is displayed within the top view image 305 shaped as a ring. The item-related information 306 further includes index information, 'T,' as well as the playlist and artist. In addition, a cursor 307 shaped as a ring is displayed in a certain region of the top view image 305. The position of the cursor 307 indicates a location where a currently focused item is located. The display unit also displays an index area 308 containing the currently focused item, by distinguishing it in color from areas of the other indexes. Furthermore, the display unit displays a 'Back' icon 309 to return back to the side view image 301.

After displaying the top view image of the item list at step 203, the controller 160 controls the touch sensing unit 131 to determine whether a certain region is selected on the top view image at step 204. In an exemplary embodiment of the present invention, selecting a certain region can be achieved by inputting a tap gesture or a touch position movement gesture. A user views a top view image of the item list and touches a region where he/she expects his/her desired item to be located. The user can directly tap a region where his/her desired item will be located. In addition, the user can touch a cursor shaped as a ring and then move it to a region where his/her desired item will be located. FIG. 3B shows a screen where the user inputs a tap gesture to a certain region in the area of index 'E.'

When the controller 160 determines that a certain region is selected on the top view image at step 204, it identifies an item corresponding to the selected region at step 205. In an exemplary embodiment of the present invention, the controller 160 controls the display unit 132 to display a cursor in the selected region and also information related to the identified item within the top view image. Referring to FIG. 3C, it is shown that a cursor shaped as a ring is displayed in a region selected by the user and item-related information 306 identified by the controller 160, index 'E,' playlist 'EARTH,' and artist 'AEROSPACE,' is displayed in the top view image 305.

After identifying an item corresponding to the selected region at step 205, the controller 160 controls the touch sensing unit 131 to determine whether the user inputs a touch position movement gesture in the up direction on the touch screen at step 206. The 'touch position movement gesture in the up direction' at step 206 corresponds to a command for altering the form of the item list. Alternatively, the controller 160 may control the touch sensing unit 131 or the key input unit 140 to determine whether an icon or a key for altering the form of the item list is touched or operated at step 206. As shown FIG. 3C, the user inputs a touch position movement gesture in the up direction on the touch screen.

When the user inputs a touch position movement gesture in the up direction on the touch screen at step 206, the controller 160 controls the display unit 132 to display a side view image of a list of items where the items are arranged so that the identified item is located in the center of the screen at step 207. The controller 160 controls the display unit 132 to display information related to a currently focused item, together with the side view image of the item list. Referring to FIG. 3D, it is shown that the item (index 'E,' playlist 'EARTH,' and artist 'AEROSPACE'), focused on the screen shown in FIG. 3C, is located at the center of the screen and displayed thereon.

After that, the user can search for his/her desired item by inputting a touch position movement gesture in both the right and left directions. The right and left directions refer to the directions where the items in the side view image of the item list are arranged. When the user inputs a touch position movement gesture in the right and left direction, the controller 160 receives a detected signal via the touch sensing unit 131 and detects a user's input touch position movement gesture. After that, the controller 160 controls the display unit 132 to rotate and display the items in the side view image of the item list. The controller 160 controls the display unit 132 to rotate and display the items according to the speed and distance of a user's input touch position movement gesture. Referring to FIG. 3D, it is shown that the user inputs a touch position movement gesture in the left direction. FIG. 3E shows a screen where the items have been rotated. That is, as shown in FIG. 3E, the center of the screen shows the items, 'ETERNAL LOVE' as the playlist and 'S.E.S' as the artist, altered from the items 'EARTH' and 'AEROSPACE' shown in FIG. 3D.

In an exemplary embodiment of the present invention, when a user selects a certain region in the top view image, his/her desired item may be directly searched for. In that case, the user can execute the searched item from the top view image. Alternatively, the user can execute a corresponding item by, for example, inputting a double tap onto the cursor displayed on the top view image, or by inputting a long tap that is retained over a preset period of time.

The user can easily and rapidly search for an item from the item list, in such a way that he/she switches the item list from the side view image to the top view image, selects an approximate location of the item to be searched, returns from the top view image to the side view image again, and then searches the item in detail.

Figure 4:
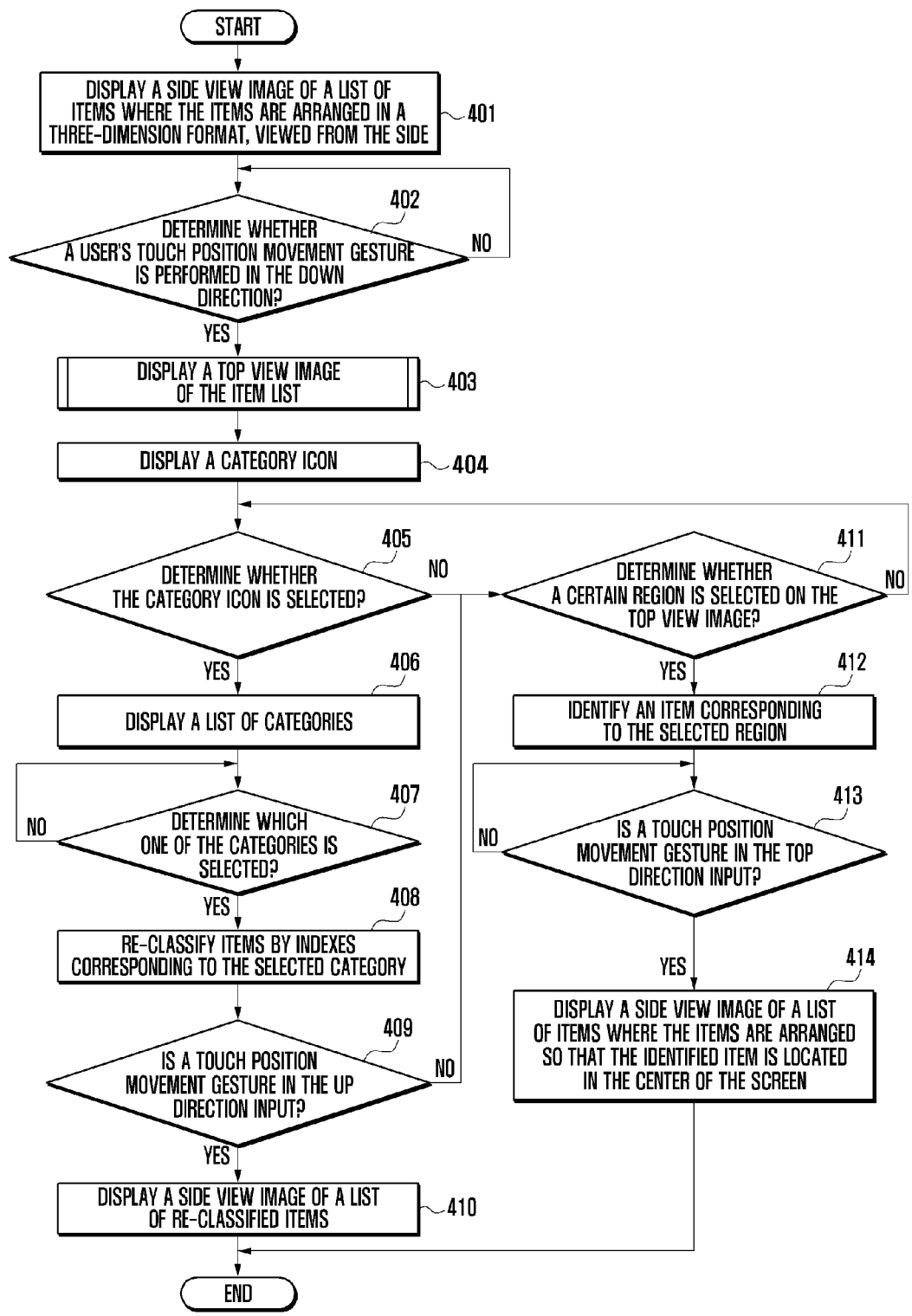
FIG. 4 is a flowchart describing an exemplary embodiment of a method for displaying a screen of a mobile device according to the present invention.

FIG. 4 is a flowchart describing an exemplary embodiment of a method for displaying a screen of a mobile device according to the present invention.

FIGS. 5A to 5H are screens that a mobile device displays on a display unit according to the method of FIG. 4.

According to this exemplary embodiment, the user can select categories from the top view image of an item list. The category refers to theme information classifying items. For example, when an item corresponds to music content, the category may be a playlist, artist, genre, album, composer, conductor, production year, etc. The categories may be assigned with different indexes, respectively. When a category is a playlist, the index may be a letter. When a category is a genre, the index may be ballad, rock, new age, electronic, etc.

Referring to FIG. 4, the controller 160 controls the display unit 132 to display a list of items where the items are arranged in a three-dimension format and viewed from the side, i.e., a side view image, at step 401. Since step 401 is the same as step 201 of FIG. 2, the description of step 201 can be identically applied to step 401 in the exemplary embodiment shown in FIG. 4.

Figure 5:
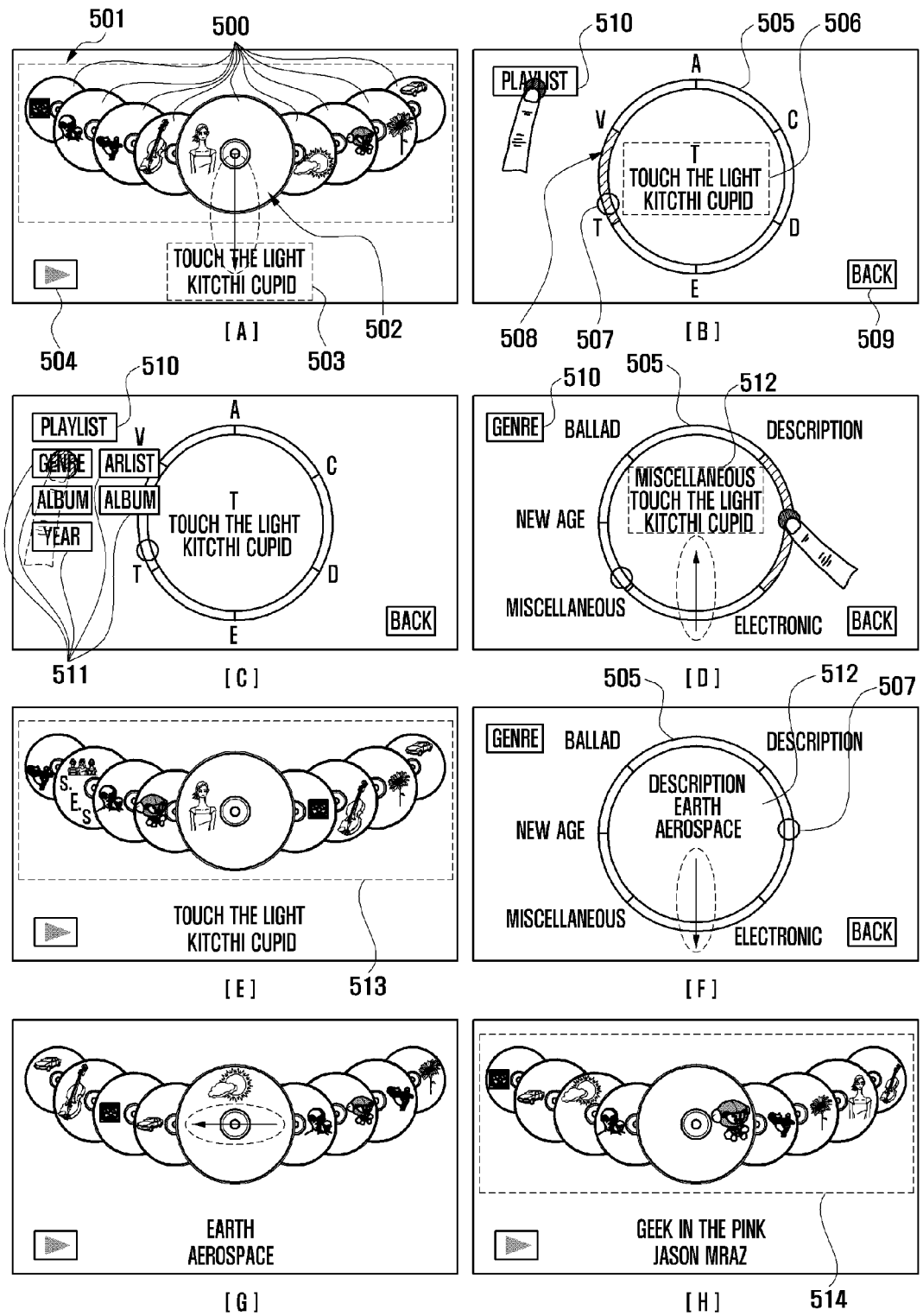
FIGS. 5A to 5H are screens that a mobile device displays on a display unit according to the method of FIG. 4.

Likewise, the screen shown in FIG. 5A is also the same screen as FIG. 3A. FIG. 5A shows a side view image 501 of a list of items where the items are music contents. The side view image 501 is configured with part of the items 500 from among all items in the list and does not display the rest of the items. The item-related information 503 (e.g., TOUCH THE LIGHT) and the artist (KITCTHI CUPID) are displayed below the focused item 502.

After displaying the side view image 501 at step 401, the controller 160 controls the touch sensing unit 131 to determine whether a user's touch gesture is performed in the down direction at step 402. Since step 402 is the same as step 202 of FIG. 2, the description of step 202 can be identically applied to step 402 in the exemplary embodiment shown in FIG. 4. In an exemplary embodiment of the present invention, the controller 160 controls the display unit 132 to display an icon to alter the form of the item list. The controller 160 also controls the touch sensing unit 131 to determine whether a touch is made on the icon displayed on the display unit 132. When the key input unit 140 includes a key to alter the form of the item list, the controller 160 controls the key input unit 140 to determine whether the key is operated.

Referring to FIG. 5A, it is shown that a user inputs a touch position movement gesture in the down direction. It is also shown that a 'Play' icon 504 for altering the form of the item list is displayed on the display unit. The user can touch the 'Play' icon 504 in order to input a command for altering the form of the item list to the mobile device, instead of inputting a touch position movement gesture in the down direction.

When the touch position movement gesture is performed in the down direction at step 402, the controller 160 controls the display unit 132 to display a top view image of the item list at step 403. After that, the controller 160 controls the display unit 132 to display a category icon on a certain region of the display unit 132 at step 404. Since step 403 is the same as step 203 of FIG. 2, the description of step 203 can be identically applied to step 403 in the exemplary embodiment shown in FIG. 4. The 'top view image' of the item list refers to an image when a user views a list of items configured in a three-dimensional form from a top view. When the item list is configured in a circle, the top view image of the item list is a two-dimensional circle image.

The controller 160 controls the display unit 132 to display a category that is currently set to a category icon. Alternatively, the controller 160 controls the display unit 132 to display an index on or adjacent to a top view image. The index, displayed by the display unit 132, is related to a category indicated by a category icon.

In an exemplary embodiment of the present invention, the controller 160 can control the display unit 132 to separate and display the indexes from each other with the same interval. In addition, the controller 160 can also control the display unit 132 to display the indexes separately with different intervals according to the index properties. The description related to displaying the indexes will be provided in detail, later, referring to FIGS. 6 to 9. Alternatively, the controller 160 controls the display unit 132 to display an additional icon for returning a current image back to the side view image of the item list. The controller 160 can control the display unit 132 to display a focus effect in a region where a currently focused item is located and also display information related to the currently focused item.

Referring to FIG. 5B, it shows a top view image 505 of the item list displayed on the display unit. A category icon 510, Playlist, is displayed on the left of the top view image 505. Of the indexes (letters) corresponding to the category Playlist, an index, related to items contained in a current item list, for example, 'A,' 'C,' 'D,' 'E,' 'T,' and 'V,' is displayed adjacent to the top view image 505. The currently focused item is the music content where the playlist is 'TOUCH THE LIGHT,' and the musician is 'KITCTHI CUPID.' As shown in FIG. 5B, the item-related information 506 is displayed within the top view image 505 shaped as a ring. The item-related information 506 further includes index information, 'T,' as well as the playlist and artist. In addition, a cursor 507 shaped as a ring is displayed in a certain region of the top view image 505. The position of the cursor 507 indicates a location where a currently focused item is located. The display unit also displays an index area 508 containing the currently focused item, by distinguishing it in color from areas of the other indexes. Furthermore, the display unit displays a 'Back' icon 509 to return back to the side view image 501.

After displaying a category icon at step 404, the controller 160 controls the touch sensing unit 131 to determine whether the category icon is selected at step 405. When the user taps the category icon, the controller 160 receives a detected signal from the touch sensing unit 131 and determines that the category icon is selected. When the category icon is selected at step 405, the controller 160 controls the display unit 132 to display a list of categories at step 406. The list of categories includes information used to classify items. For example, when an item corresponds to music content, the category may be a playlist, artist, genre, album, composer, conductor, production year, etc. The category may be displayed in an area adjacent to a category icon. In that case, the top view image of the item list is processed by a dimming process. The category is also displayed, superimposed on the top view image. In another exemplary embodiment, the category may be displayed in an area other than an area occupied by the top view image, so that it cannot be superimposed on the top view image.

Referring to FIG. 5C, it is shown that a number of categories 511 is displayed near the category icon 510. For example, the categories are 'Genre,' 'Artist,' 'Album,' 'Playlist,' and 'Year.' As shown in FIG. 5C, the top view image 505 is processed by a dimming process and the categories, 'Genre,' 'Artist,' 'Album,' 'Playlist,' and 'Year,' are superimposed with the top view image 505.

After displaying a list of categories at step 406, the controller 160 controls the touch sensing unit 131 to determine which one of the categories is selected at step 407. When the user taps and selects a category at step 407, the controller 160 receives a detected signal from the touch sensing unit 131 and determines the user's selected category. As shown in FIG. 5C, the user taps and selects one of the categories 511, for example, Genre.

After that, the controller 160 re-classifies items by indexes corresponding to the selected category at step 408. The categories may be assigned with different indexes, respectively. When information about a category is altered, the index for classifying items is also altered. The controller 160 re-classifies items according to the altered index and then controls the display unit 132 to display the altered index. The indexes are displayed with the same interval or different intervals.

Referring to FIG. 5D, when the user selects 'Genre,' an altered screen is displayed on the display unit 132. FIG. 5D also shows that the indexes corresponding to 'Genre', for example, 'Description,' 'Electronic,' 'Miscellaneous,' 'New Age,' and 'Ballad,' are displayed adjacent to the top view image 505. The indexes, 'Description,' 'Electronic,' 'Miscellaneous,' 'New Age,' and 'Ballad,' are separated from each other with different intervals. The controller 160 identifies information about a currently set category and determines whether to separate and display the indexes with the same interval or different intervals. Referring to FIG. 5D, it is shown that a category icon 510 set with 'Genre' is displayed. It is also shown that information 512 related to a currently focused item (index 'Miscellaneous,' playlist 'TOUCH THE LIGHT,' and artist 'KITCTHI CUPID') is displayed within the top view image 505.

After re-classifying the items at step 408, the controller 160 controls the touch sensing unit 131 to determine whether the user inputs a touch position movement gesture in the up direction on the touch screen at step 409. Since step 409 is the same as step 206 of FIG. 2, the description of step 206 can be identically applied to step 409 in the exemplary embodiment shown in FIG. 4. The controller 160 may control the touch sensing unit 131 or the key input unit 140 to determine whether a key for returning back to the side view image is operated.

When the user inputs a touch position movement gesture in the up direction on the touch screen at step 409, the controller 160 controls the display unit 132 to display a side view image of a list of re-classified items at step 410.

FIG. 5E shows a screen of the display unit 132 to which the screen shown in FIG. 5D is altered when the user inputs a touch position movement gesture in the up direction.

Referring to FIG. 5E, it is shown that the display unit 132 displays a side view image of the item list where music content item, Playlist 'TOUCH THE LIGHT' and artist 'KITCTHI CUPID,' is located in the center. The items in the side view image 513 shown in FIG. 5E differ in terms of order from those of the side view image 501 shown in FIG. 5A. This is produced from the re-classification of items according to the alteration of category information. For example, when the user selects a category, 'Genre,' as shown in FIG. 5C, the items are re-classified as shown in FIG. 5D. This re-classification of items can be identically applied to the side view image 513 shown in FIG. 5E.

On the contrary, when the user does not input a touch position movement gesture in the up direction on the touch screen at step 409, the controller 160 determines whether a certain region is selected on the top view image at step 411. After that, the controller 160 performs steps 412 to 414 that are the same as steps 205 to 207 shown in FIG. 2, so that their descriptions of steps 205 to 207 can be identically applied to steps 412 to 414 in the exemplary embodiment shown in FIG. 4. The user views a top view image of the item list and touches a region where he/she expects an item to be searched for will be located. The user can tap a region where an item to be searched for will be located. In addition, the user can touch a cursor shaped as a ring and then move it to a region where an item to be searched for will be located. FIG. 5D shows that the user is inputting a tap gesture to a certain region in the area of index 'DESCRIPTION.'

When the user selects a certain region on the top view image, the controller 160 identifies an item corresponding to the selected region at step 412. After that, the controller 160 controls the display unit 132 to move and display a cursor to the selected region. The controller 160 also controls the display unit 132 to display information related to the identified item within the top view image. Referring to FIG. 5F, the cursor 507 is displayed on the selected region. It is also shown that information 512 related to the selected item (index 'DESCRIPTION,' playlist 'EARTH,' and artist 'AEROSPACE') is displayed in the top view image 505.

After that, the controller 160 controls the touch sensing unit 131 to determine whether the user inputs a touch position movement gesture in the up direction on the touch screen at step 413. When the user inputs a touch position movement gesture in the up direction on the touch screen at step 413, the controller 160 controls the display unit 132 to display a side view image of a list of items where the items are arranged so that the identified item is located in the center of the screen at step 414. Referring to FIG. 5G, it is shown that the focused item (playlist 'EARTH' and artist 'AEROSPACE') is located at the center of the screen and displayed thereon.

After that, the user can search for his/her desired item by inputting a touch position movement gesture in the right and left directions. When the user inputs a touch position movement gesture in the right and left directions, the controller 160 receives a detected signal via the touch sensing unit 131 and detects a user's input touch position movement gesture. After that, the controller 160 controls the display unit 132 to rotate and display the items in the side view image of the item list. The controller 160 controls the display unit 132 to rotate and display the items according to the speed and distance of a user's input touch position movement gesture.

Referring to FIG. 5G, it is shown that the user inputs a touch position movement gesture in the left direction. FIG. 5H shows a screen of the result that the items have been rotated. In an exemplary embodiment of the present invention, it is assumed that a touch position movement gesture is input in the left direction with the same speed and distance in the exemplary embodiments shown in FIGS. 3D and 5G. Comparing FIG. 3E with FIG. 5H, the display unit 132 displays different items in the center. That is, as shown in FIG. 3E, the center of the screen shows the item, 'ETERNAL LOVE' as the playlist and 'S.E.S' as the artist. As shown in FIG. 5G, it shows the items 'GEEK IN THE PINK' as the playlist and 'JASON MRAZ' as the artist. These are the results as the items are re-classified according to the alteration of categories. The user selects a category 'Genre' in the screen as shown in FIG. 5D and re-classifies the items in the screen as shown in FIG. 5D. The result of item re-classification can be identically applied to the side view image 514 shown in FIG. 5H.

In an exemplary embodiment of the present invention, when a user selects a certain region in the top view image, his/her desired item may be directly searched for. In that case, the user can execute the searched item on the top view image. Alternatively, the user can execute a corresponding item by, for example, inputting a double tap onto the cursor displayed on the top view image, or by inputting a long tap that is retained over a preset period of time.

The user can easily and rapidly search for an item from the item list, in such a way that he/she switches the item list from the side view image to the top view image, alters a category to another to re-classify items, selects an approximate location of the item to be searched for, returns the top view image to the side view image again, and then searches for the item in detail.

On the contrary, when the category icon is not selected at step 405, the controller 160 determines whether a certain region is selected on the top view image at step 411 and then performs steps 412 to 414 as described above.

In the following, a description is made about steps 203 and 403, contained in the methods of FIGS. 2 and 4, where the controller 160 displays indexes on the display unit 132.

Figure 6:
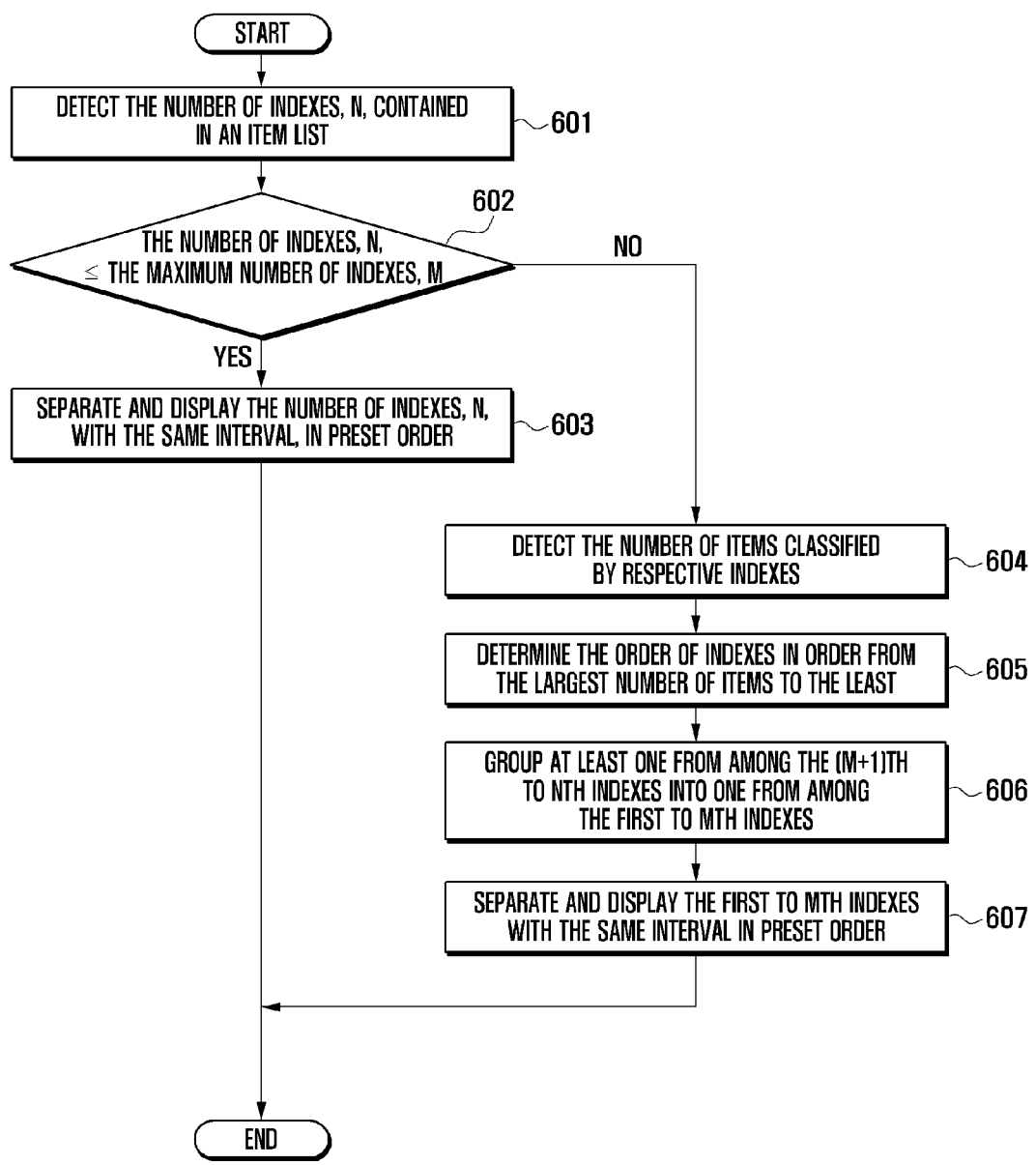
FIG. 6 is a flowchart describing an exemplary embodiment of a method for displaying an index in a mobile device according to the present invention.

FIG. 6 is a flowchart describing an exemplary embodiment of a method for displaying an index in a mobile device according to the present invention.

FIGS. 7A and 7B are an arrangement of an index according to the method of FIG. 6.

This exemplary embodiment is implemented in such a way that the indexes are displayed with the same interval.

Referring to FIG. 6, the controller 160 detects the number of indexes, N, contained in an item list at step 601. In this exemplary embodiment, it is assumed that an item is music content, a category is a playlist, and an index is a letter. When the item list contains items of playlists starting with letters 'A,' 'C,' 'D,' 'E,' 'T,' and 'V,' the controller 160 detects that the number of indexes, N, is six at step 601.

The controller 160 compares the number of indexes, N, with the maximum number of indexes, M, that can be displayed in one screen, at step 602. If the number of indexes gradually increases, all of the indexes may not be displayed on one screen. To prevent this problem, the mobile device 100 may set a maximum number of indexes, M. In that case, the controller 160 controls the display unit 132 to display indexes up to the maximum number of indexes, M.

When the number of indexes, N, is equal to or less than the maximum number of indexes, M, at step 602, the controller 160 controls the display unit 132 to separate and display the number of indexes, N, with the same interval, in preset order at step 603. For example, when N is six and M is eight, the controller 160 concludes that N is less than M and controls the display unit 132 to separate and display six indexes with the same interval. When the indexes are arranged in alphabetical order, the controller 160 controls the display unit 132 to display the indexes in alphabetical order, 'A,' 'C,' 'D,' 'E,' 'T,' and 'V.' When the top view image of the item list is formed as a circle, the controller 160 controls the display unit 132 to display letters 'A,' 'C,' 'D,' 'E,' 'T,' and 'V' around the circle, separated from each other with 60°, as shown in FIG. 7A.

On the other hand, when the number of indexes, N, is greater than the maximum number of indexes, M, at step 602, the controller 160 detects the number of items classified by respective indexes at step 604. For example, when the item list contains a number items corresponding to indexes 'A,' 'B,' 'C,' 'D,' 'E,' 'F,' 'G,' 'T,' 'V,' and 'W,' the controller 160 detects that N is 10 and compares N with M of 8. The controller 160 concludes that N is greater than M and detects the number of items classified by the respective indexes. It is assumed for this example that the numbers of items classified by 'A,' 'B,' 'C,' 'D,' 'E,' 'F,' 'G,' 'T,' 'V,' and 'W,' are 10, 9, 9, 8, 7, 1, 2, 11, 9, and 8, which are detected by the controller 160.

The controller 160 determines the order of indexes in order from the largest number of items to the least, at step 605. For example, the controller 160 determines the order of indexes in order of 'T,' 'A,' 'B,' 'C,' 'V,' 'D,' 'W,' 'E,' 'F,' and 'G.'

After that, the controller 160 groups at least one from among the $(M+1)^{th}$ to $N^{th}$ indexes into one from among the first to $M^{th}$ indexes at step 606. In an exemplary embodiment of the present invention, the controller 160 controls the display unit 132 to display grouping information. For example, the controller 160 groups indexes, 'F,' and 'G,' corresponding to the $(M+1)^{th}$ ($9^{th}$) and the $N^{th}$ ($10^{th}$), respectively, into one of the 'T,' 'A,' 'B,' 'C,' 'V,' 'D,' 'W,' and 'E.' The grouping operation may be performed based on an index closest to 'F' and 'G.' For example, when the indexes 'T,' 'A,' 'B,' 'C,' 'V,' 'D,' 'W,' 'E,' 'F,' and 'G' are arranged in alphabetical order, they can be arranged in alphabetical order, 'A,' 'B,' 'C,' 'D,' 'E,' 'F,' 'G,' 'T,' 'V,' and 'W.' In that case, the indexes closest to 'F' and 'G' are 'E' and 'T.' In an exemplary embodiment of the present invention, the controller 160 can group a corresponding index into the foregoing or following index closest to the corresponding index. In an exemplary embodiment of the present invention, it is assumed in this example that the controller 160 groups 'F' and 'G' into the foregoing index, 'E.'

After that, the controller 160 controls the display unit 132 to separate and display the first to $M^{th}$ indexes with the same interval in preset order at step 607. For example, the controller 160 separates and displays the first to eighth indexes, 'T,' 'A,' 'B,' 'C,' 'V,' 'D,' 'W,' and 'E,' with the same interval in preset order. An example of the preset order may be, for example, an alphabetical order or an order from the largest number of items to the least. When the top view image of the item list is formed as a circle, the controller 160 controls the display unit 132 to display letters, 'T,' 'A,' 'B,' 'C,' 'V,' 'D,' 'W,' and 'E,' around the circle, separated from each other with 45°, as shown in FIG. 7B.

As shown in FIG. 7B, the indexes are arranged in alphabetical order, 'A,' 'B,' 'C,' 'D,' 'E,' 'F,' 'G,' 'T,' 'V,' and 'W,' and separated from each other with 45°. In particular, index 'E' is displayed as 'E (F, G) to indicate grouping information where 'F' and 'G' are grouped into 'E.'

In another exemplary embodiment of the present invention, an index corresponds to letters, numbers, or other symbols can be grouped into one index. That is, when every letter is displayed around the top view image, numbers or other symbols may be grouped into one index, and this index is then displayed.

Figure 8:
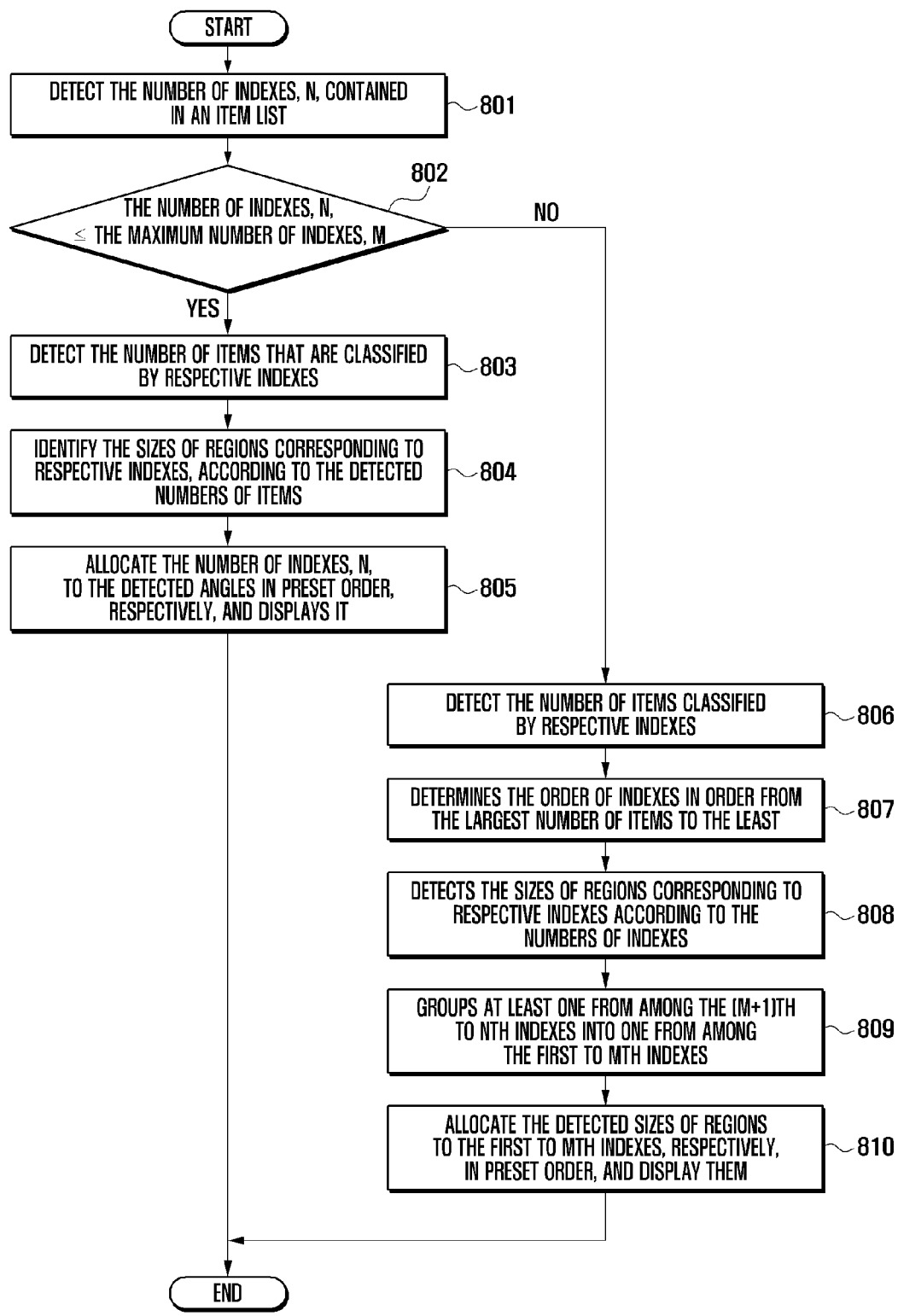
FIG. 8 is a flowchart describing an exemplary embodiment of a method for displaying an index in a mobile device according to the present invention.

FIG. 8 is a flowchart describing an exemplary embodiment of a method for displaying an index in a mobile device according to the present invention.

FIGS. 9A and 9B are an arrangement of an index according to the method of FIG. 8.

Referring to FIG. 8, the controller 160 detects the number of indexes, N, contained in an item list, at step 801. In this exemplary embodiment, it is assumed that an item is music content, a category is genre, and an index is genre name. When the item list contains items of genres 'Description,' 'Electronic,' 'Miscellaneous,' 'New Age,' and 'Ballad,' the controller 160 detects that the number of indexes, N, is five at step 601.

The controller 160 compares the number of indexes, N, with a maximum number of indexes, M, that can be displayed in one screen, at step 802. When the number of indexes, N, is equal to or less than the maximum number of indexes, M, at step 802, the controller 160 detects the number of items that are classified by respective indexes at step 803. In an exemplary embodiment of the present invention, it is assumed that the numbers of items, classified by 'Description,' 'Electronic,' 'Miscellaneous,' 'New Age,' and 'Ballad,' are 10, 8, 5, 5, and 8, respectively, which are detected by the controller 160.

The controller 160 identifies the sizes of regions corresponding to respective indexes, according to the detected numbers of items, at step 804. For example, when the top view image of an item list is shaped as a circle so that the respective indexes have total angles (size of regions) of 360° in proportion to the number of items, the controller 160 can detect the angles (size of regions) corresponding to 'Description,' 'Electronic,' 'Miscellaneous,' 'New Age,' and 'Ballad,' as 100°, 80°, 50°, 50°, and 80°, respectively.

After that, the controller 160 controls the display unit 132 to allocate the number of indexes, N, to the detected angles in preset order, respectively, and displays it at step 805. In an exemplary embodiment of the present invention, as shown in FIG. 9A, it is assumed that the display order of indexes are 'Description,' 'Electronic,' 'Miscellaneous,' 'New Age,' and 'Ballad,' to which angles 100°, 80°, 50°, 50°, and 80°, are allocated, respectively.

On the contrary, when the number of indexes, N, is determined to be greater than the maximum number of indexes, M, at step 802, the controller 160 detects the number of items classified by respective indexes at step 806. In an exemplary embodiment of the present invention, it is assumed that the item list contains items corresponding to genres 'Description,' 'Electronic,' 'Jazz,' 'Miscellaneous,' 'New Age,' 'Ballad,' and 'Funk' and the numbers of items classified by 'Description,' 'Electronic,' 'Jazz,' 'Miscellaneous,' 'New Age,' 'Ballad,' and 'Funk' are 10, 4, 4, 5, 5, 7, and 1, respectively. In that case, when the maximum number of indexes, M, is set to six, the controller 160 determines that the number of indexes, N (7), is greater than the maximum number of indexes, M (6).

The controller 160 determines the order of indexes in order from the largest number of items to the least at step 807. For example, the controller 160 determines the order of indexes in order of 'Description,' 'Ballad,' 'Miscellaneous,' 'New Age,' 'Electronic,' 'Jazz,' and 'Funk.' After that, the controller 160 detects the sizes of regions corresponding to respective indexes according to the numbers of indexes at step 808. When the top view image of an item list is shaped as a circle so that the respective indexes have total angles (size of regions) of 360° in proportion to the number of items, the controller 160 can detect the angles (size of regions) corresponding to 'Description,' 'Ballad,' 'Miscellaneous,' 'New Age,' 'Electronic,' 'Jazz,' and 'Funk' as 100°, 70°, 50°, 50°, 40°, 40° and 10°, respectively.

After that, the controller 160 groups at least one from among the $(M+1)^{th}$ to $N^{th}$ indexes into one from among the first to $M^{th}$ indexes at step 809. In an exemplary embodiment of the present invention, the controller 160 controls the display unit 132 to display grouping information. For example, the controller 160 groups the seventh index 'Funk' into one of the indexes, 'Description,' 'Ballad,' 'Miscellaneous,' 'New Age,' 'Electronic,' and 'Jazz.' The grouping operation may be performed based on an index closest to the index 'Funk.' When the display order of indexes is set as 'Description,' 'Ballad,' 'Miscellaneous,' 'New Age,' 'Electronic,' 'Jazz,' and 'Funk,' the index 'Ballad' is closest to 'Funk.' The controller 160 can group the index 'Funk' into 'Ballad.' In that case, the angle (size of region) allocated to the index 'Funk' is also added to that of 'Ballad.'

The controller 160 controls the display unit 132 to allocate the detected angles (sizes of regions) to the first to $M^{th}$ indexes, respectively, in preset order and displays them at step 810. The first to $M^{th}$ indexes correspond to 'Description,' 'Ballad,' 'Miscellaneous,' 'New Age,' 'Electronic,' and 'Jazz,' respectively. In an exemplary embodiment of the present invention shown in FIG. 9B, it is assumed that the display order of indexes is set as 'Description,' 'Electronic,' 'Jazz,' 'Miscellaneous,' 'New Age,' and 'Ballad.' As shown in FIG. 9A, the indexes 'Description,' 'Electronic,' 'Jazz,' 'Miscellaneous,' 'New Age,' and 'Ballad' are allocated with angels, 100°, 40°, 40°, 40°, 50° and 80° (=70°+10°), respectively. The index 'Ballad' is displayed as 'Ballad (Funk)' indicating the grouping information.

As described above, the controller 160 controls the display unit 132 to enlarge and display the area of the grouped index. Alternatively, the controller 160 controls the display unit 132 to display to re-arrange and display the indexes on the top view image of the item list. When the other indexes are grouped into one index, a user has difficulty selecting a region in the area of the grouped index, where a corresponding item is located. For example, when indexes 'B' and 'C' are grouped to index 'A' and a user intends to select an item classified by the index 'B,' the user cannot select the index 'B' from the top view image of the item list, so he/she must select first the index 'A.'

When the user touches an area of the index 'A,' the controller 160 controls the display unit 132 to enlarge and display the area of the index 'A' or to arrange and display the top view image of the item list with the indexes contained in the area of the index 'A.' In addition, when a user touches an area of index 'A' over a preset period of time, the controller 160 controls the display unit 132 to enlarge and display the area of index 'A' or to arrange and display the top view image of the item list with the indexes contained in the area of the index 'A.' Alternatively, when a user drags on an area of index 'A' or multi-touches both ends of the area of index 'A,' the controller 160 controls the display unit 132 to enlarge and display the area of index 'A' or to arrange and display the top view image of the item list with the indexes contained in the area of the index 'A.'

FIGS. 10A to 10D are various shapes of grouped index areas according to an exemplary embodiment of the present invention.

Referring to FIG. 10A, the display unit 132 displays a top view image of an item list and indexes 'A,' 'D,' 'E,' 'F,' 'G,' and 'H.' The indexes 'B' and 'C' are grouped into the index 'A.' FIG. 10B shows a first modification of displaying the grouped index area, enlarging the area of the index 'A'. The enlarged area of the index 'A' shows the indexes 'B' and 'C.' FIG. 10C shows a second modification of displaying the grouped index area, enlarging the area of the index 'A' in the center of the screen, while the top view image of the item list is being processed by a dimming process. The enlarged area of the index 'A' shows the indexes 'B' and 'C' as well. FIG. 10D shows a third modification of displaying the grouped index area, showing a top view image of the item list that differs from the original top view image. The controller 160 arranges and displays the top view image of the item list, using the indexes 'A,' 'B,' and 'C.' Therefore, these various shapes of the grouped index areas allow the user to more precisely select a region in the area of the index where a corresponding item is located.

As described above, the mobile device 100 can display the side view image and the top view image. The side view image shows detailed information about an item but does not show the entire item in the list. The top view image does not show detailed information about an item, but shows the entire item in the list. Therefore, the mobile device 100 allows the user to easily and rapidly search for a corresponding item, using the side view image or top view image.

As described above, an exemplary method and system of the present invention can allow a user to easily and rapidly search for a corresponding item on a screen of a mobile device. The method and system can also vary the item list in various forms on the screen of the mobile device, which provides an interesting feature for the mobile device user.

While the invention has been shown and described with reference to certain exemplary embodiments thereof, it will be understood by those skilled in the art that that various changes in form and details may be made therein without departing from the spirit and scope of the invention as defined in the appended claims and their equivalents.

What is claimed is:

1. A method for displaying a screen, the method comprising:
    displaying a first view image of an ordered list of discrete items having items arranged in a three-dimensional form and sorted by a category of each item, the first view image comprising at least one item of the ordered list and a display form viewed from a first direction of the three-dimensional form;
    displaying, when there is an input for altering the first view image of the ordered list, a second view image of the entire ordered list of the three-dimensional form and a display form of the entire ordered list viewed from a second direction of the three-dimensional form;
    identifying at least an item corresponding to a selected region when a certain region is selected on the second view image; and
    displaying information related to the identified item within the second view image,
    wherein the first view image displays the at least one item as a currently focused item in the ordered list distinguished from other items in the ordered list,
    wherein the second view image forms a circle and displays the entire ordered list as the three-dimensional form divided into discrete categories of the items grouped according to a category of each item, and does not display discrete items that are displayed together in the first view image other than the focused item, and
    wherein the input for altering the display form is a touch and drag input that is performed in a direction perpendicular to the arrangement of the items or a key set input.

2. The method of claim 1, wherein displaying the second view image comprises displaying category information with the discrete categories.

3. The method of claim 1, wherein displaying the second view image comprises displaying information related to the currently focused item.

4. The method of claim 1, further comprising:
    identifying, when there is an input on the second view image, an item corresponding to the input; and
    displaying, when there is another input for altering the display form of the ordered list, the first view image comprising at least part of the items including the identified item.

5. The method of claim 4, further comprising displaying information related to the identified item.

6. The method of claim 4, wherein the another input for altering the display form is a touch and drag input in a direction opposite to a direction of the input for the display form or a key set input.

7. The method of claim 4, wherein displaying the first view image comprising at least part of the items including the identified item comprises displaying the identified item in a center of the at least part of the ordered list.

8. The method of claim 1, further comprising:
identifying, when there is an input on the second view image, a category corresponding to the input; and
displaying, when there is another input for altering the display form of the ordered list, the first view image comprising at least part of the items included in the identified category.

9. The method of claim 1, wherein the category is an index.

10. The method of claim 1, further comprising:
re-sorting, when there is an input for selecting type of the category, the items by the selected type of the category.

11. The method of claim 1, wherein displaying the second view image comprises:
determining a number of indexes (N) contained in the ordered list;
comparing the number of indexes (N) contained in the ordered list with a number of indexes (M) that can be displayed on one screen; and
displaying, when N is equal to or less than M, the N indexes in a preset order.

12. The method of claim 11, wherein displaying the second view image further comprises:
determining, when N is greater than M, a number of items classified by respective indexes;
determining an order of the indexes in an order from a largest number of items to a least; and
displaying the first to $M^{th}$ indexes in the preset order.

13. The method of claim 12, wherein displaying the second view image further comprises:
grouping at least one index from among the $(M+1)^{th}$ to $N^{th}$ indexes into one from among the first to $M^{th}$ indexes.

14. The method of claim 11, wherein the displaying of the N indexes comprises:
detecting a number of items classified by respective indexes;
determining sizes of regions corresponding to the respective indexes according to the detected number of items; and
allocating the determined sizes of regions to the N indexes, in the preset order, and displaying them.

15. The method of claim 14, further comprising:
detecting, when N is greater than M, the number of items classified by respective indexes;
determining an order of indexes in order from a largest number of items to a least;
determining sizes of regions corresponding to the first to $M^{th}$ indexes, according to the detected number of items; and
allocating the determined sizes of regions to the first to $M^{th}$ indexes, in the preset order, and displaying them.

16. The method of claim 15, wherein displaying the second view image further comprises:
grouping at least one index from among the $(M+1)^{th}$ to $N^{th}$ indexes into one from among the first to $M^{th}$ indexes.

17. A system for displaying a screen, the system comprising:
a display unit;
an input unit configured to receive a command; and
a processor configured to:
control the display unit to display a first view image of an ordered list of discrete items having items arranged in a three-dimensional form and sorted by a category of each item, the first view image comprising at least one item of the ordered list and a display form viewed from a first direction of the three-dimensional form,
control the display unit to display, when there is an input for altering the first view image of the list of discrete items, a second view image of the entire ordered list of the three-dimensional form and a display form of the entire ordered list viewed from a second direction of the three-dimensional form,
identify at least an item corresponding to a selected region when a certain region is selected on the second view image, and
control the display unit to display information related to the identified item within the second view image,
wherein the first view image displays the at least one item as a currently focused item in the ordered list distinguished from other items in the ordered list,
wherein the second view image forms a circle and displays the entire ordered list as the three-dimensional form divided into discrete categories of the items grouped according to a category of each item, and does not display discrete items that are displayed together in the first view image other than the focused item, and
wherein the input for altering the display form is a touch and drag input that is performed in a direction perpendicular to the arrangement of the items or a key set input.

* * * * *